United States Patent [19]
Brown

[11] Patent Number: 5,970,195
[45] Date of Patent: Oct. 19, 1999

[54] FIBER OPTIC CABLE FURCATION UNIT

[75] Inventor: Gair D. Brown, King George, Va.

[73] Assignee: The United States of America as represented by the Secretary of the Navy, Washington, D.C.

[21] Appl. No.: 09/286,844

[22] Filed: Apr. 6, 1999

Related U.S. Application Data

[63] Continuation of application No. 08/944,105, Sep. 30, 1997, Pat. No. 5,903,693.

[51] Int. Cl.⁶ .................................................. G02B 6/44
[52] U.S. Cl. ...................... 385/100; 385/106; 385/109; 385/112; 385/113
[58] Field of Search .............................. 385/80, 100–114, 385/96

[56] References Cited

U.S. PATENT DOCUMENTS

| | | | |
|---|---|---|---|
| 4,923,268 | 5/1990 | Xu | 385/96 |
| 5,201,019 | 4/1993 | Gallusser et al. | 385/99 |
| 5,231,688 | 7/1993 | Zimmer | 385/139 |
| 5,259,050 | 11/1993 | Yamakawa et al. | 385/59 |
| 5,297,227 | 3/1994 | Brown et al. | 385/56 |
| 5,473,718 | 12/1995 | Sommer | 385/85 |
| 5,903,693 | 5/1999 | Brown | 385/100 |

*Primary Examiner*—Phan T. H. Palmer
*Attorney, Agent, or Firm*—James B. Bechtel, Esq.

[57] ABSTRACT

A low cost rugged sealed fiber optic cable furcation unit is provided. The furcation unit has an outer heat shrink tube which encloses a protective tube. Within the protective tube, a spacer/fiber guide is located along with a sealant material. When installed and sealed, the sealed furcation unit includes fiber ends and cables. The furcation unit allows loose tube fiber optic cables or tube ducts within Air Blown Fiber (AEF) cables to be furcated into multiple single fiber cables. The furcation unit is compatible with both 250 micrometer and 500 micrometer coated optical fibers. The furcation unit is also compatible with common single fiber optical connectors and splices.

30 Claims, 2 Drawing Sheets

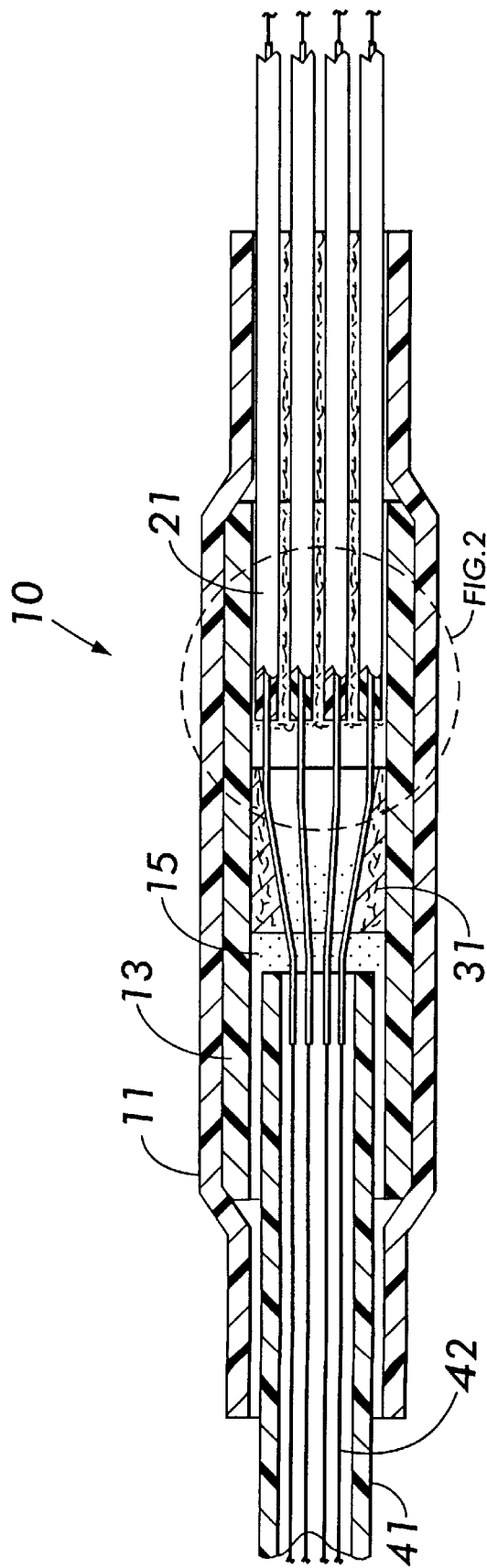

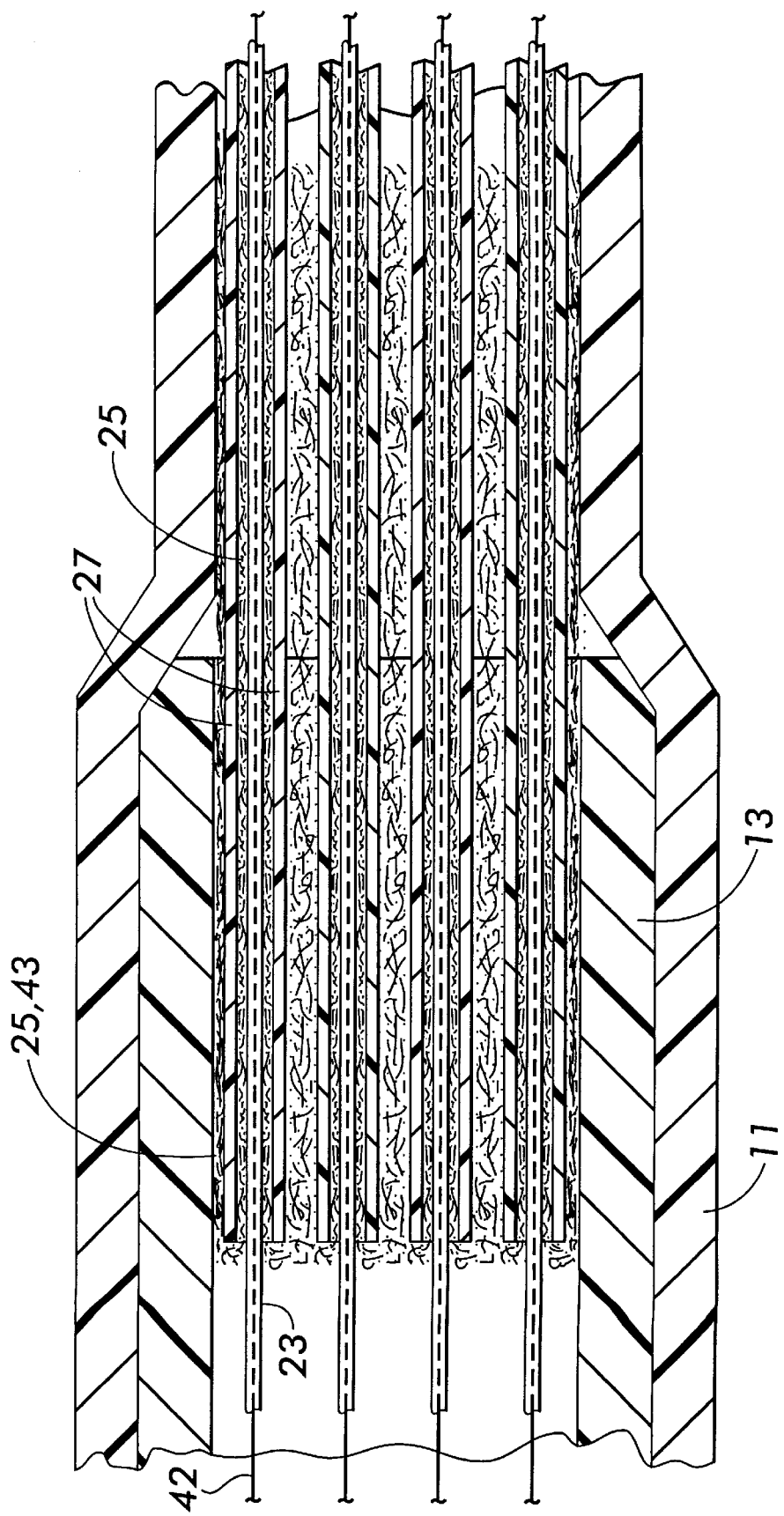

FIBER OPTIC CABLE FURCATION UNIT

This application is a continuation of copending application Ser. No. 08/944,105 filed on Sep. 30, 1997 now is U.S. Pat. No. 5,903,693.

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The present invention relates generally to optical fiber connectors and more specifically to furcation units for optical fiber cables.

BACKGROUND OF THE INVENTION

In recent years, electro-optical equipment has begun to replace electronic equipment for certain applications, such as telecommunication and data communication networks. This trend should continue because the electro-optical equipment has inherent advantages over purely electronic equipment. These advantages include a broader bandwidth for signal transmission, greater storage capability for data, and inherent immunity to electromagnetic interference. Given these advantages of electro-optical equipment, fiber optic cables have become increasingly important because they transmit information and signals between the various pieces of electro-optical equipment.

The appearance of these cables resemble electrical cables, but fiber optic cables are smaller in size and lighter in weight. Fiber optic cables comprise optical fibers and other cable elements which are protected from the external environment by an external jacketing. These cables may be of a traditional design with the fibers surrounded by strength members and protective elements in the cable core or of a more non-traditional, loosely-bundled type with the fibers contained loosely within tubes or ducts in a cable core.

Whether traditional or loosely-bundled, all types of optical fiber cables may contain groups of optical fibers with no individual protective jacketing or strength members. These fibers are typically 250 micrometers or 500 micrometers in diameter. At the ends of the fiber optic cables, the small unprotected fibers must be removed from the outer protective cable structure and inserted into fiber optic connection devices (connectors or splices). Due to the small size of the fibers and the lack of protective coverings over the individual fibers, connectorization and splicing is difficult. Special protective equipment must be used to organize the loose fibers and to protect the completed connections. In order to make the installation of fiber cables reliable and efficient, a furcation unit is needed which allows individual optical fibers to be easily handled, connectorized, and spliced. Further. in order to prevent degradation of the prepared fibers, the furcation unit must protect the fiber ends from moisture, dust, and other contaminants.

SUMMARY OF THE INVENTION

Accordingly, it is an object of the present invention to provide a device to mechanically protect optical fibers exposed at a fiber optic cable termination point.

Another object of the invention is to provide a device to seal the end of the fiber optic cable against moisture, dirt and insects.

Another object of the invention is to provide connector installer with a cable end that is compatible with typical single fiber optical connectors and splices.

A further object of the present invention is to provide a means for organizing single fiber stands within a multi-fiber optical cable.

A still further object of the present invention is to provide a simple to use furcation unit allowing for fast, efficient installation by field technicians.

In accordance with the foregoing and additional objects, a sealed fiber optic cable furcation unit is provided. The furcation unit comprises an outer heat shrink tubing containing a concentrically-located protective tube which, in turn, contains a spacer/fiber guide and sealant material. The furcation unit allows the sealed connection of a single cable containing multiple fibers with multiple cables containing individual fibers. The furcation unit seals the end of the fiber optic cable and guides the fibers into protective loose tube single fiber cables suitable for handling and termination. When sealed, the furcation unit includes the prepared ends of the multiple cables and the single cables containing multiple fibers. The single fiber cables are securely attached within the furcation unit using adhesive to prevent accidental removal of any members of the single fiber cable from the furcation unit during connectorization or splicing operations.

BRIEF DESCRIPTION OF THE DRAWINGS

The foregoing objects and other advantages of the present invention will be more fully understood from the following detailed description and reference to the appended drawings wherein:

FIG. 1 is a cross-sectional view of the fiber optic cable furcation unit; and

FIG. 2 is an expanded cross-sectional view of the portion of the fiber optic cable furcation unit containing the ends of the loose tube single fiber optical cables.

DETAILED DESCRIPTION OF THE INVENTION

Referring now to FIG. 1, fiber optical cable furcation-unit 10 for furcating fiber optic cables is shown. The furcation unit 10 comprises an adhesive coated heat shrink tubing 11, enclosing a protective tube 13 and a sealant material 15. The furcation unit 10 further comprises a plurality of loose tube single fiber optical cables 21 and a spacer/fiber guide 31. The furcation unit 10 fits onto the end of a fiber optic cable 41 allowing the optical fibers 42 to pass through the spacer/fiber guide 31 and protective tube 13 into the loose tube single fiber optical cables 21. The adhesive coated heat shrink tubing 11 securely holds the furcation unit 10 onto the optical fiber cable 41 and firmly holds the protective tube 13 and the multiple loose tube single fiber optical cables 21 in position. In the preferred embodiment, the heat shrink tubing is a polyolefin tube and the protective tube is a polyethylene plastic tube. The furcation unit 10, when constructed in this manner, is extremely rugged and can withstand bending, dropping, tensile loads and other rigors. The sealant material 15 fills any voids in the end of the fiber optic cable 41, and further fills any voids between the fiber optic cable 41 and the protective tube 13. A variety of sealant materials may be used including silicone sealants or other similar material. The sealant material 15 also fills a short length within the interior of the protective tube 13, thereby completing the sealing of the furcation unit 10 to the fiber optic cable 41.

The spacer/fiber guide 31 loosely fits within the protective tube 13 and may be held in place by the sealant material 15. Depending on the type of fiber optic cable, the spacer/fiber guide 31 may not be required.

Referring now to FIG. 2, the loose tube single fiber cables each comprise an inner tube 23, strength members 25, and an outer protective jacketing 27. The loose tubes can be fabricated using nylon tubes and the strength members may be fabricated using an arimid fiber material. In the preferred embodiment, Kevlar™ fiber is used for the strength members. The inner tube 23 is dimensioned so that the optical fibers 42 can easily be passed through a length of the tube and so that the inner tube 23 can be inserted into the rear of common fiber optic connectors and splices. The strength members 25 are used within the loose tube single fiber cables 21 to allow proper termination of the optical fiber 42 into fiber optic connectors and splices which are designed to attach to a single fiber cable strength member. The strength members 25 protrude from the interior end of the loose tube single fiber cables 21 and are folded back along the exterior of the loose tube single fiber cables and are captured in the adhesive matrix 43, (in this case a two-part epoxy adhesive). Captured in this manner, the loose tube single fiber cable 21 cannot be accidentally pulled out of the furcation unit 10 during the optical fiber 42 termination process. The inner tubes 23 also protrude from the interior end of the loose tube single fiber cables 21. Thus, the optical fiber 42 is never in contact with any adhesive material used in the adhesive matrix 43. In addition, the adhesive matrix 43 seals the end of the furcation unit 10 where the loose tube single fiber optical cables 21 are contained, keeping moisture, dirt, and insects out of the interior of the furcation unit 10.

In some cases the inner tubes 23 may be extended through the sealant material 15 into the fiber optic cable 41 (as shown in FIG. 1). This approach is advantageous because it allows the optical fiber 42 to pass completely through the furcation unit 10 without coming in contact with either the sealant material 15 or the material used in the adhesive matrix 43.

The unique features of this invention include a furcation unit which protects the fibers within a multi-fiber optical cable from damage, seals to the end of the multi-fiber optical cable, captures the strength members within the individual loose tube single fiber cables within the furcation unit and provides a single fiber connector and splice compatible single fiber cable structure. The advantages of this invention include the low cost of the components used to construct the furcation unit, the ruggedness of the furcation unit and the tensile strength of the furcation unit.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. An assembly, including:
   a structure that contains a plurality of optical fibers;
   a furcation tube assembly that includes a plurality of loose tube optical fiber cables, wherein the plurality of optical fibers are coupled to respective ones of the plurality of loose tube optical fiber cables; and,
   a heat shrink tube that joins the structure and the furcation tube assembly.

2. The assembly as set forth in claim 1, further including a protective tube surrounded by the heat shrink tube and disposed in surrounding relationship to the furcation tube assembly.

3. The assembly as set forth in claim 2, wherein the protective tube is made of a rigid material that provides structural support to withstand bending and tensile loads.

4. The assembly as set forth in claim 3, wherein the heat shrink tube comprises an adhesive-coated heat shrink tube.

5. The assembly as set forth in claim 4, wherein the heat shrink tube comprises a polyolefin tube.

6. The assembly as set forth in claim 3, wherein the rigid material comprises a plastic material.

7. The assembly as set forth in claim 2, wherein the protective tube comprises a polyetheylene plastic tube.

8. The assembly as set forth in claim 2, wherein the hollow inner tube of each of the plurality of loose tube optical fiber cables comprises a nylon tube.

9. The assembly as set forth in claim 2, wherein the strength members of each of the plurality of loose tube optical fiber cables are comprised of an arimid fiber material.

10. The assembly as set forth in claim 9, wherein the adhesive matrix of each of the plurality of loose tube optical fiber cables comprises a two-part epoxy adhesive matrix.

11. The assembly as set forth in claim 2, further including a spacer/fiber guide located within the protective tube to direct respective ones of the plurality of optical fibers from the structure that contains the plurality of optical fibers to the respective ones of the plurality of loose tube optical fiber cables.

12. The assembly as set forth in claim 1, wherein each of the plurality of loose tube optical fiber cables includes:
   a hollow inner tube;
   a support structure that includes strength members embedded in an adhesive matrix, the support structure surrounding the hollow inner tube; and,
   a protective jacket surrounding the support structure.

13. The assembly as set forth in claim 12, further including a protective tube surrounded by the heat shrink tube and disposed in surrounding relationship to the furcation tube assembly, wherein the protective tube is made of a rigid material that provides structural support to withstand bending and tensile loads.

14. The assembly as set forth in claim 13, wherein the heat shrink tube comprises an adhesive-coated heat shrink tube.

15. The assembly as set forth in claim 1, herein the structure comprises a fiber optic cable.

16. The assembly as set forth in claim 1, wherein the plurality of optical fibers include at least end portions that are unprotected.

17. The assembly as set forth in claim 1, wherein the plurality of loose tube optical fiber cables are each coupled to a fiber optic connector.

18. The assembly as set forth in claim 1, wherein the plurality of loose tube optical fiber cables are each coupled to a fiber optic splice.

19. The assembly as set forth in claim 1, further including a sealant material that seals the structure that contains the plurality of optical fibers.

20. The assembly as set forth in claim 1, wherein the heat shrink tube comprises an adhesive-coated heat shrink tube.

21. A method, including the steps of:
   providing a structure that contains a plurality of optical fibers;
   providing a furcation tube assembly that includes a plurality of loose tube optical fiber cables;
   joining the structure and the furcation tube assembly with a heat shrink tube; and,
   coupling the plurality of optical fibers to respective ones of the plurality of loose tube optical fiber cables.

22. The method as set forth in claim 21, further including the step of assembling a protective tube in surrounding relationship to the furcation tube assembly and inside of the heat shrink tube in substantially concentric relationship thereto.

23. The method as set forth in claim 22, wherein the protective tube is made of a rigid material that provides structural support to withstand bending and tensile loads.

24. The method as set forth in claim 23, wherein the heat shrink tube comprises an adhesive-coated heat shrink tube.

25. The method as set forth in claim 21, wherein the plurality of optical fibers include at least end portions that are unprotected.

26. The method as set forth in claim 21, further including the step of connectorizing the plurality of loose tube optical fiber cables to a fiber optic connector.

27. The method as set forth in claim 21, further including the step of connectorizing the plurality of loose tube optical fiber cables to a fiber optic splice.

28. The method as set forth in claim 21, wherein the structure comprises a fiber optic cable.

29. The method as set forth in claim 21, wherein the heat shrink tube comprises an adhesive-coated heat shrink tube.

30. The method as set forth in claim 21, wherein the step of providing a furcation tube assembly that includes a plurality of loose tube optical fiber cables includes the sub-steps of:

providing a plurality of hollow inner tubes;

constructing a support structure by embedding a plurality of strength members in an adhesive matrix in surrounding relationship to the plurality of hollow inner tubes; and, assembling a protective jacket in surrounding relationship to the support structure.

* * * * *